United States Patent [19]

Grenier et al.

[11] Patent Number: 4,863,497
[45] Date of Patent: Sep. 5, 1989

[54] OZONE-PRODUCING PLANT

[75] Inventors: Maurice Grenier, Paris; Pierre Petit, Chatenay Malabry, both of France

[73] Assignee: L'air Liquide, Societe Anonyme Pour L'etude et L'exploitation des Procedes Georges Claude, Paris, France

[21] Appl. No.: 230,153

[22] Filed: Aug. 9, 1988

Related U.S. Application Data

[62] Division of Ser. No. 940,812, Dec. 19, 1986, Pat. No. 4,786,489.

[51] Int. Cl.$^4$ ............................................... B01D 53/06
[52] U.S. Cl. ......................................... 55/181; 55/390
[58] Field of Search ................... 55/20, 25, 26, 31, 34, 55/68, 74, 75, 77, 78, 180, 181, 387, 389, 390

[56] References Cited

U.S. PATENT DOCUMENTS

| 2,630,191 | 3/1953 | Miller | 55/34 X |
|---|---|---|---|
| 2,799,362 | 7/1957 | Miller | 55/34 X |
| 3,201,921 | 8/1965 | Heyes | 55/78 X |
| 3,504,483 | 4/1970 | Tamura et al. | 55/180 |
| 3,607,133 | 9/1971 | Hirao et al. | 55/390 X |
| 3,800,859 | 4/1974 | Norback | 55/390 X |
| 3,855,719 | 12/1974 | Jonsson | 55/390 X |
| 4,143,118 | 3/1979 | Laing | 55/68 X |
| 4,183,728 | 1/1980 | Leitzke et al. | 55/68 X |
| 4,259,299 | 3/1981 | Hagiwara et al. | 55/68 X |
| 4,421,533 | 12/1983 | Nishino et al. | 55/68 |
| 4,430,306 | 2/1984 | Namba et al. | 55/75 X |
| 4,522,726 | 6/1985 | Berry et al. | 55/181 X |
| 4,589,892 | 5/1986 | Leonard | 55/390 X |
| 4,764,276 | 8/1988 | Berry et al. | 55/181 X |

Primary Examiner—Robert Spitzer
Attorney, Agent, or Firm—Young & Thompson

[57] ABSTRACT

Each ozonization loop (1) which includes a compressor (2), an ozonizer (3), and a heat exchanger (8) for cooling the oxygen-ozone mixture, is associated with three cylinders (4,5,6) filled with silica gel. Each cylinder operates in succession in a cocurrent adsorption, in countercurrent desorption by a substitution gas, and in scavenging by taking off a part of the flow circulating in the loop. The scavenging flow is recovered and combined with the substitution gas. The substitution gas may be in particular impure nitrogen supplied by an air distillation apparatus producing the necessary oxygen.

16 Claims, 14 Drawing Sheets

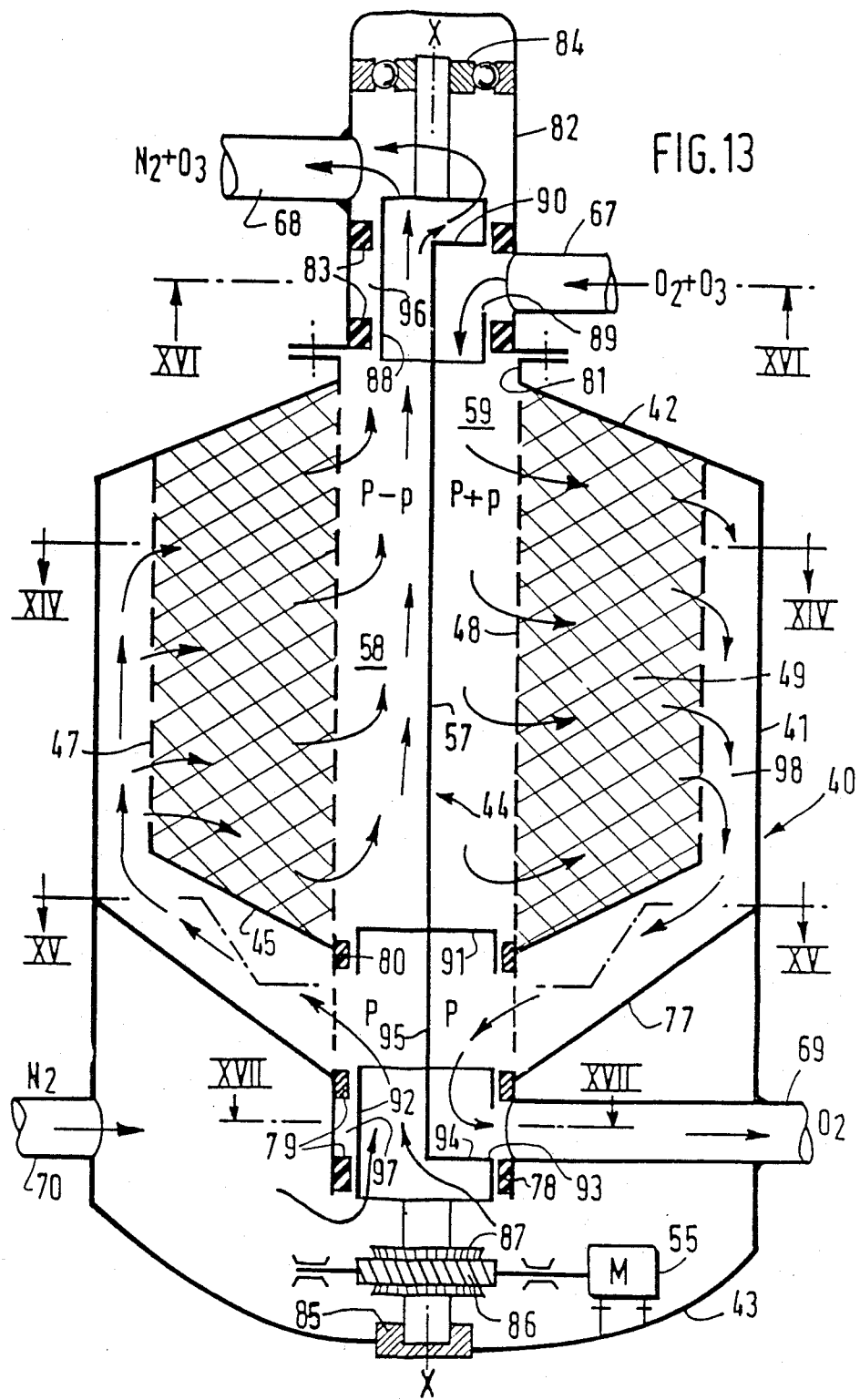

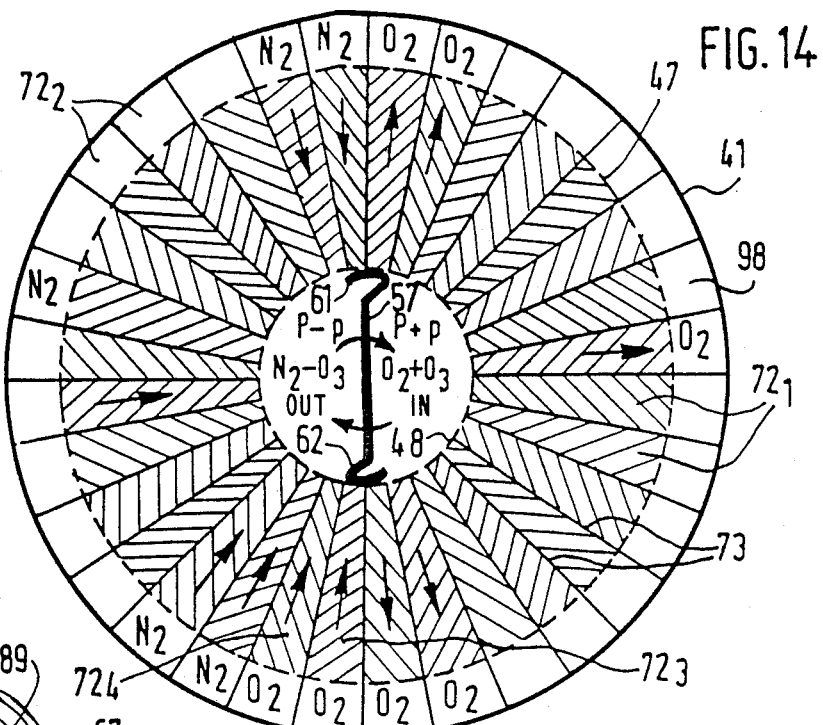
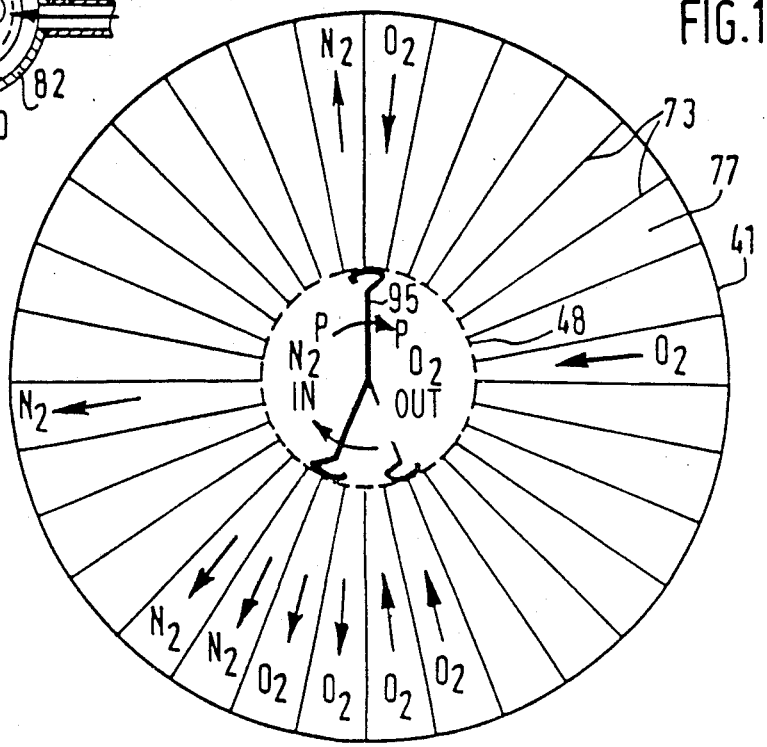

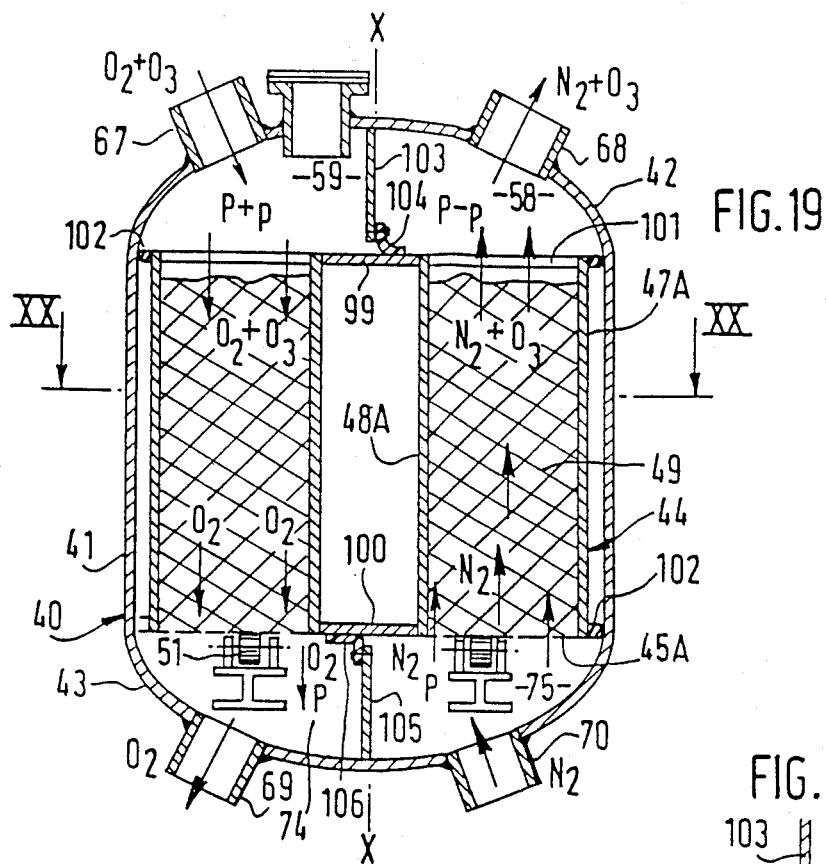
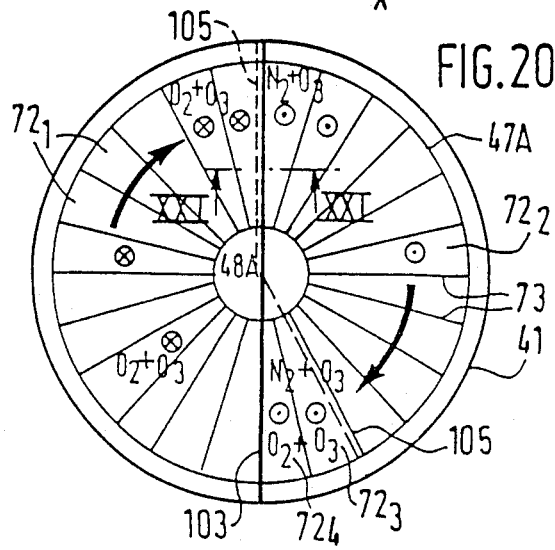
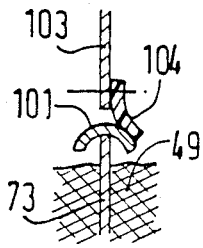
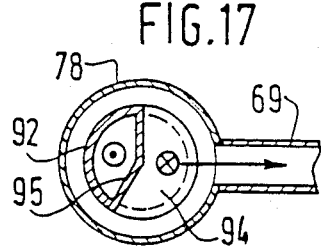
FIG. 19
FIG. 21
FIG. 20
FIG. 17

OZONE-PRODUCING PLANT

This application is a division, of application Ser. No. 06/940,812, filed 12/19/86, which issued to U.S. Pat. No. 4,786,489 on Nov. 22, 1988.

The present invention relates to an ozone-producing apparatus of the type in which oxygen circulating in an ozonization loop is partly ozonized in an ozonizer and then the ozone is trapped by adsorption and desorbed by a substitution gas.

An object of the invention is to provide improvements in the known apparatus of this type so as to reduce the investment costs in particular for the production of large quantities of ozone, for example on the order of 1,800 kg/h of ozone.

The invention provides a plant for this purpose. In a first embodiment, this plant is characterised in that it comprises:

a case containing an annular bed of adsorbent material divided into a number of sectors;

partition walls dividing the volume between this annular bed and the case into four spaces respectively communicating with a first oxygen-ozone mixture inlet orifice, a second oxygen outlet orifice, a third substitution gas inlet orifice, and a fourth outlet orifice of a production gas essentially comprising substitution gas and ozone, these partition walls putting said first orifice in communication with the upstream side, with respect to the adsorption, of a first group of said sectors, said second orifice with the downstream side, with respect to the adsorption, of a second group of sectors constituted by said first group of sectors and a third group of sectors adjacent to said first group, said third orifice with the upstream side, with respect to the countercurrent desorption, of a fourth group of sectors constituted by the remaining sectors, and said fourth orifice with the downstream side, with respect to the desorption, of said fourth and third groups of sectors; and means for effecting a relative rotation between the annular bed and said partition walls in such direction that each sector is successively and cyclically part of said first, fourth and third groups.

In another embodiment, the plant is characterised in that it comprises:

a case containing an annular bed of adsorbent material divided into a number of sectors;

partition walls dividing the volume between this annular bed and the case into four spaces respectively communicating with a first oxygen-ozone mixture inlet orifice, a second oxygen outlet orifice, a third substitution gas inlet orifice, and a fourth outlet orifice for production gas essentially constituted by substitution gas and ozone, these partition walls putting said second orifice in communication with the downstream side, with respect to the adsorption, of a first group of sectors, said first orifice with the upstream side, with respect to the adsorption, of a second group of sectors constituted by said first group and a third group of sectors adjacent to said first group, said fourth orifice with the downstream side, with respect to the countercurrent desorption, of a fourth group of sectors constituted by the remaining sectors, and said third orifice with the upstream side, with respect to the desorption, of said third and fourth groups of sectors; and means for effecting a relative rotation between the annular bed and said partition walls in such direction that each sector is successively and cyclically part of said first, fourth and third groups.

Some embodiments of the invention will now be described with reference to the accompanying drawings, in which.

Figure 1:
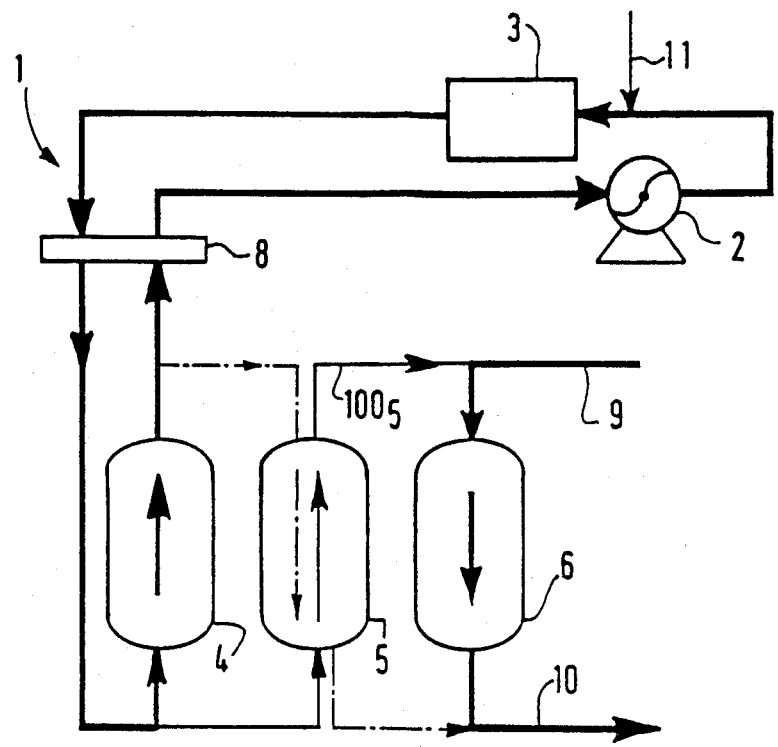
FIG. 1 is a simplified diagram of an ozone-producing plant according to the invention.
Figure 3:
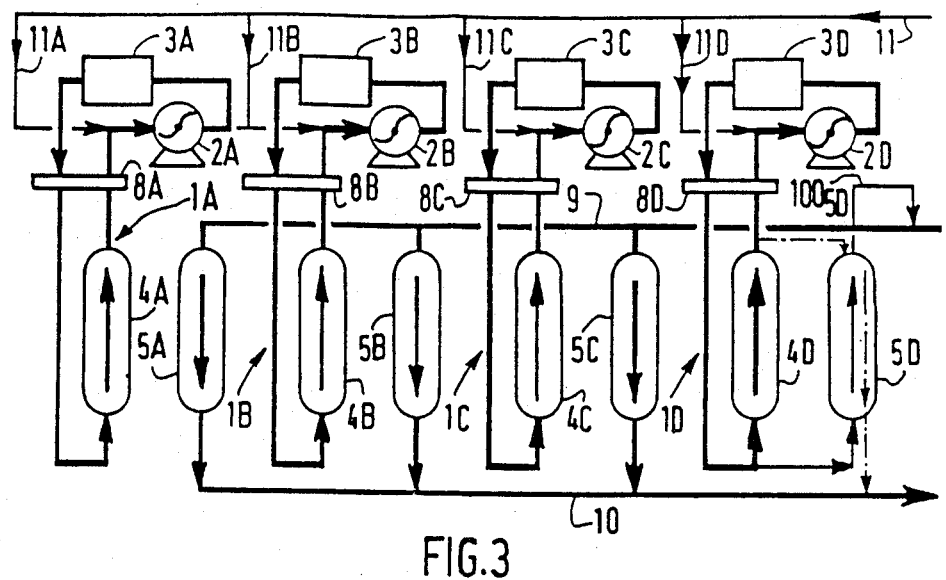
FIG. 3 is a simplified diagram of another ozone-producing plant according to the invention.
Figure 5A:
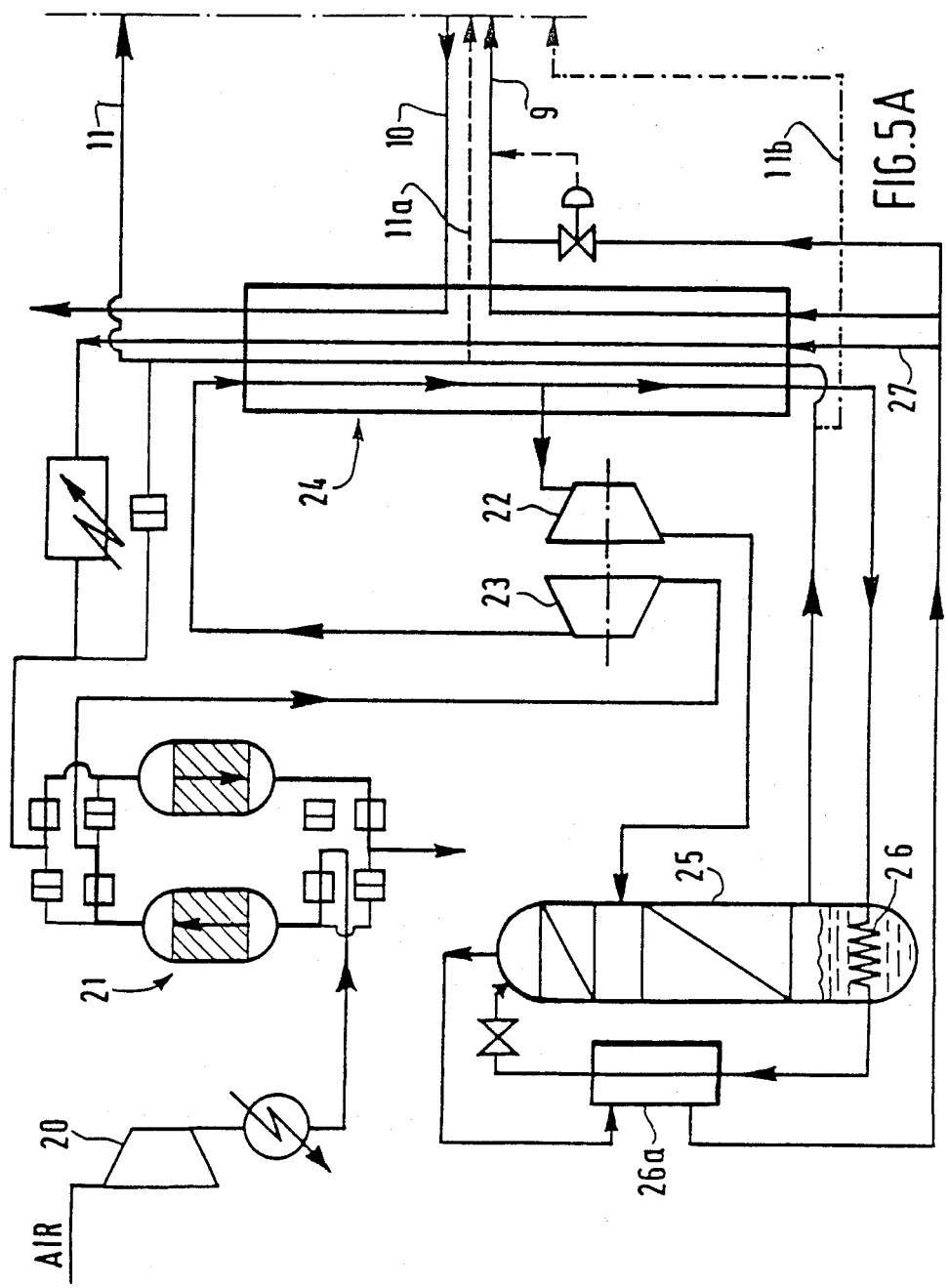
Figure 5B:
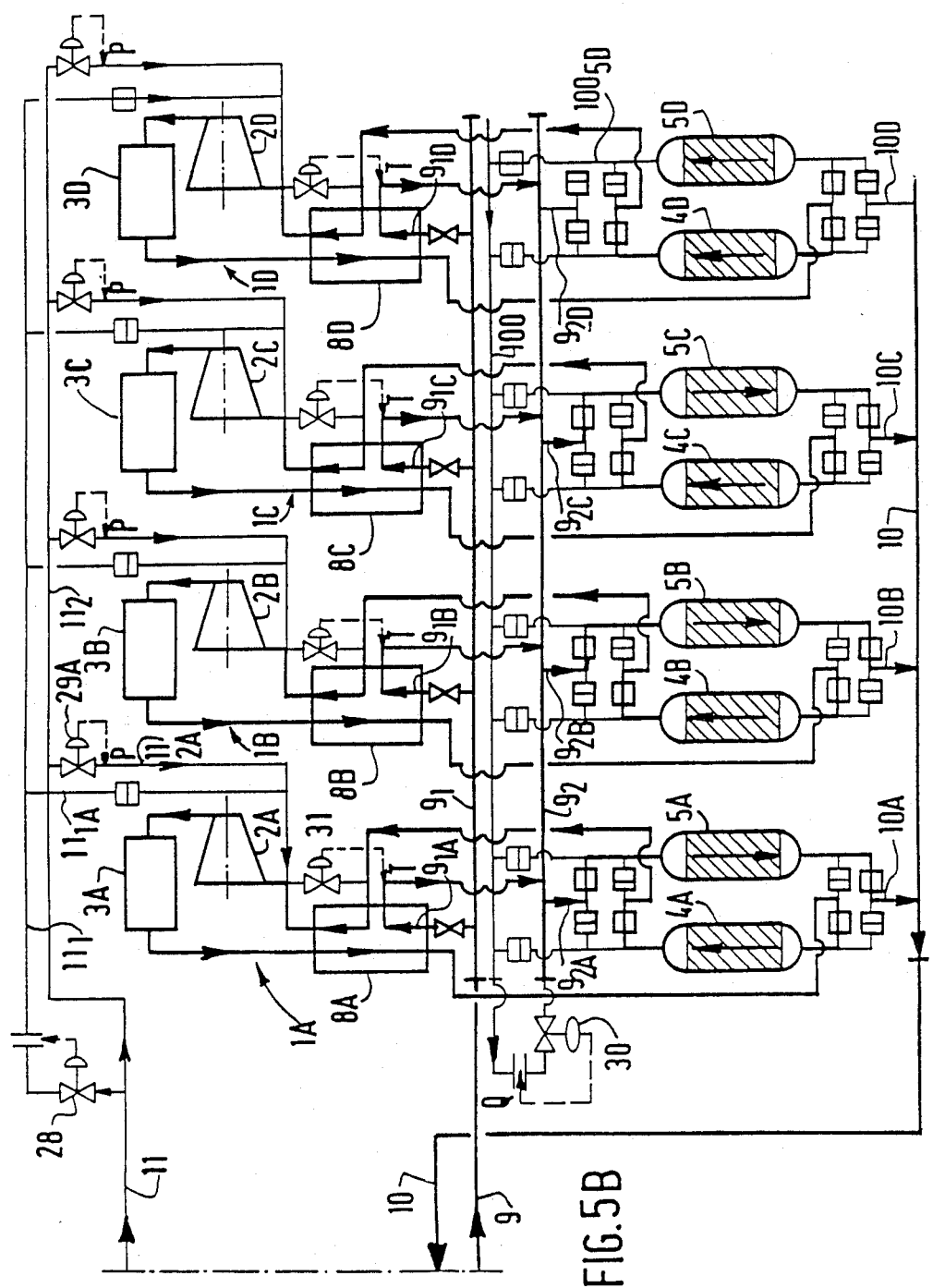
Figure 6:
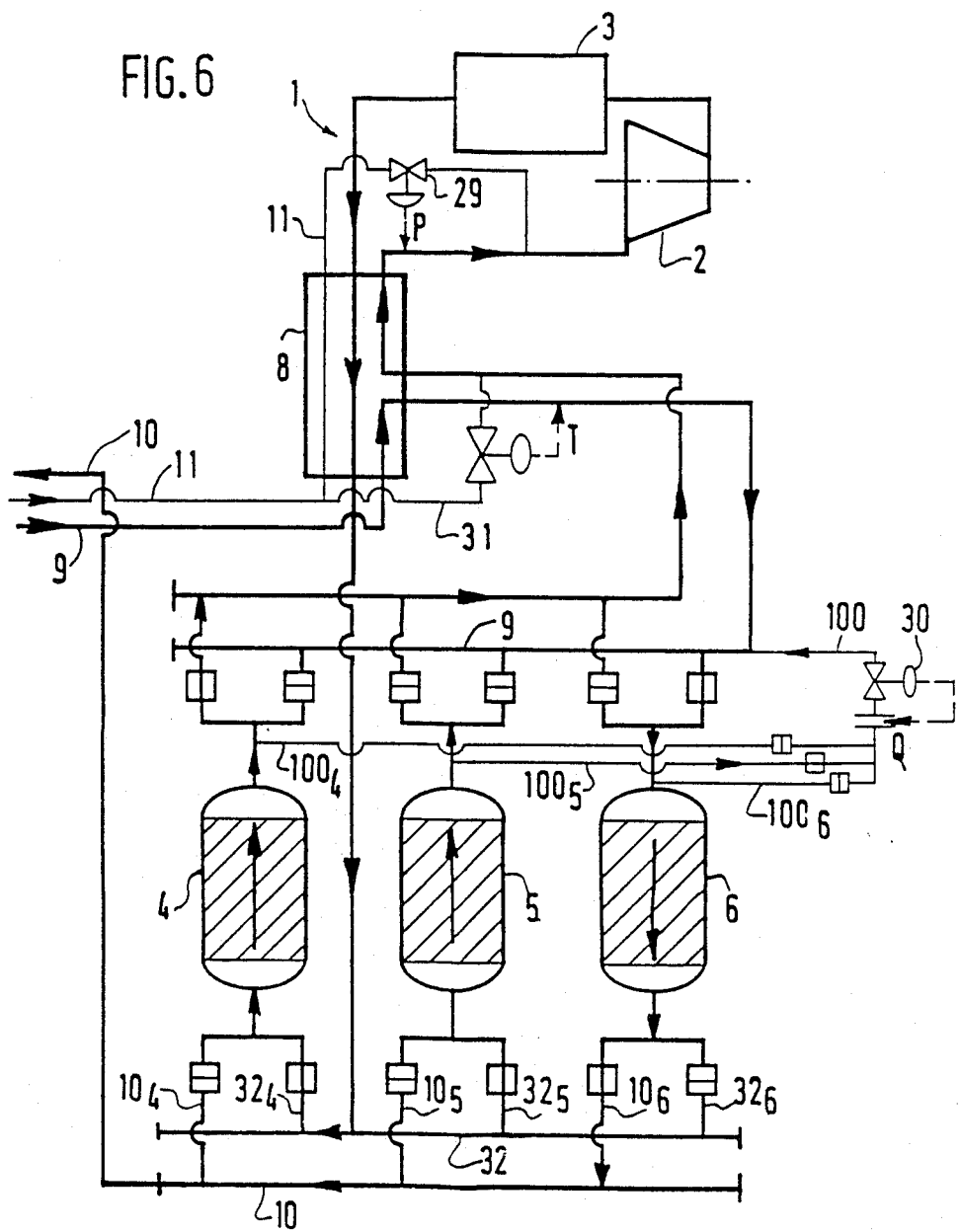
Figure 7:
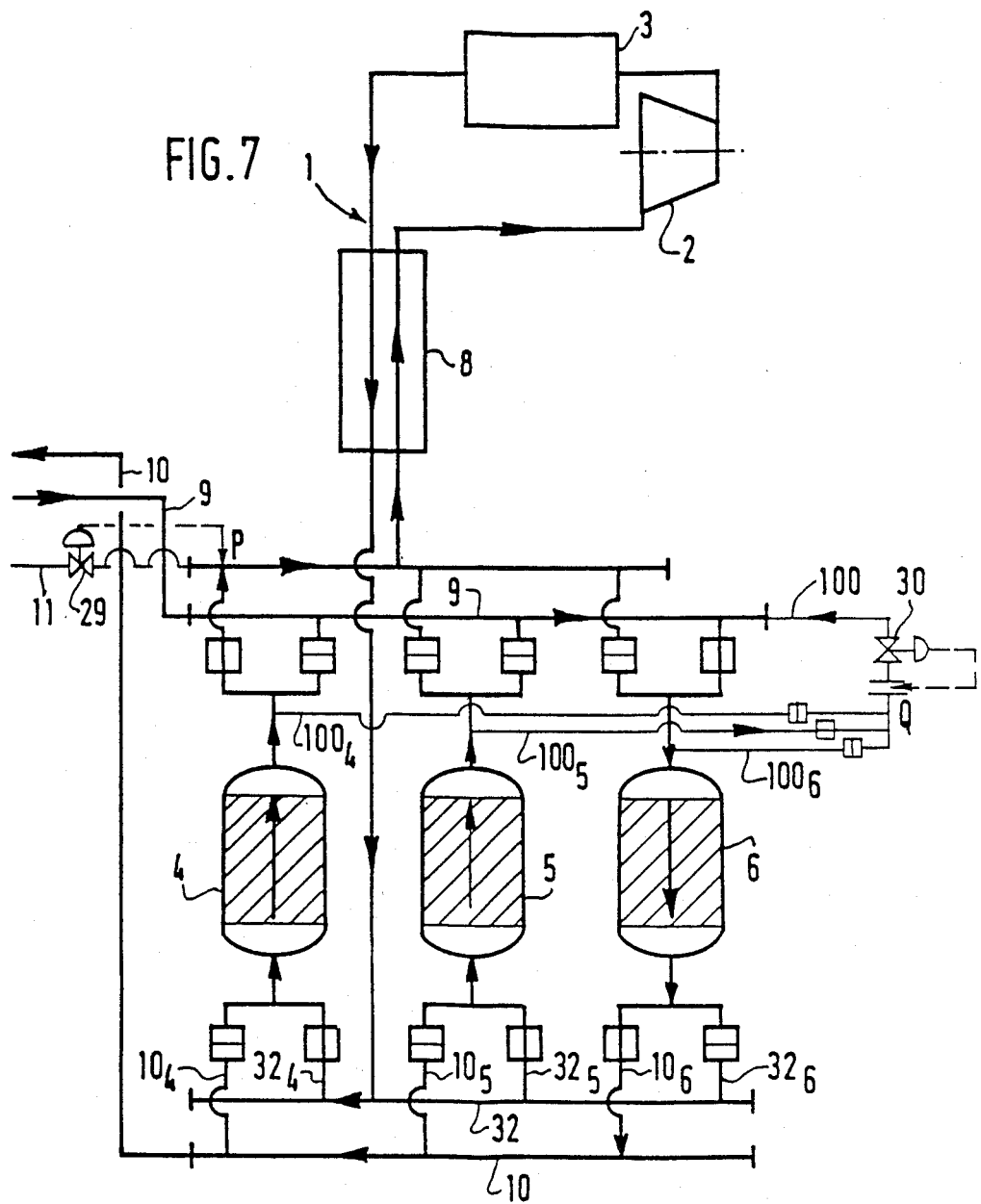
Figure 8:
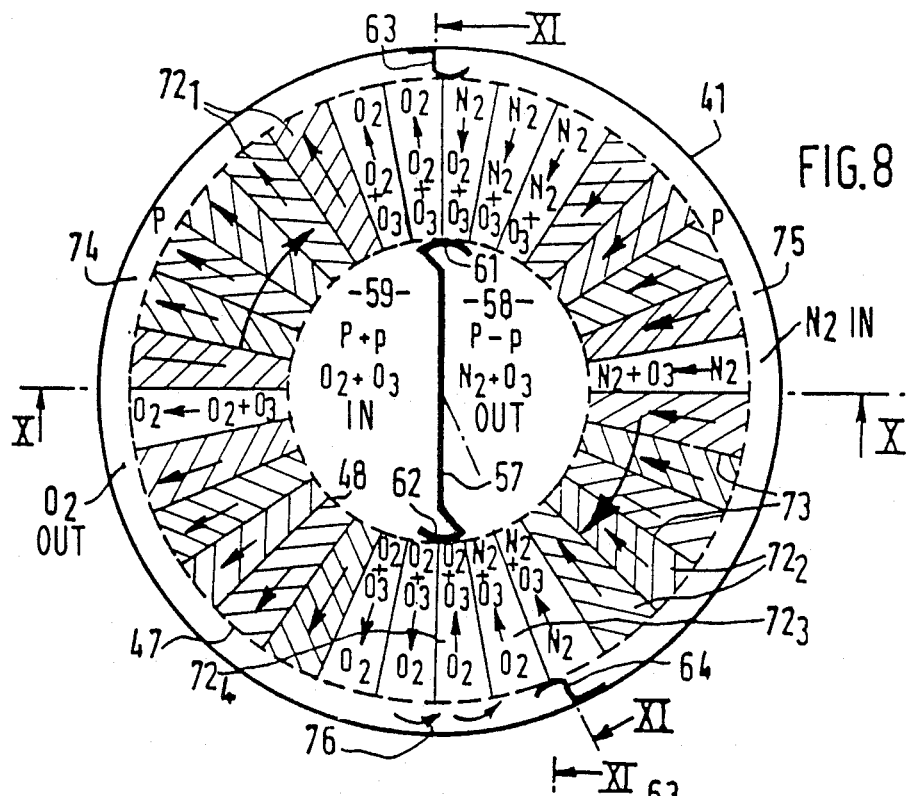
Figure 9:
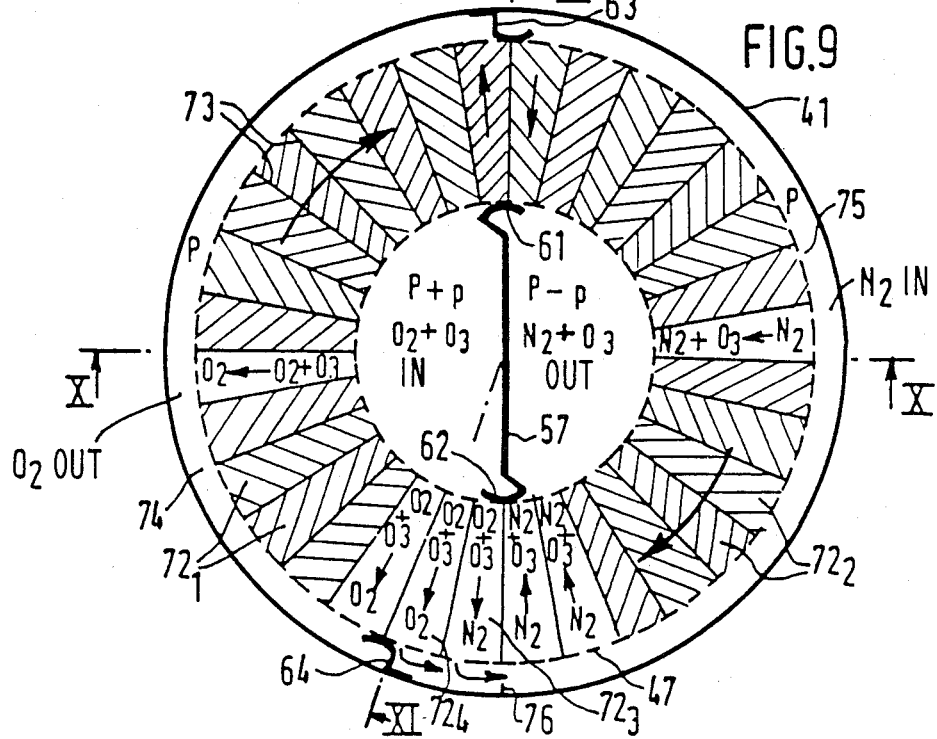
Figure 10:
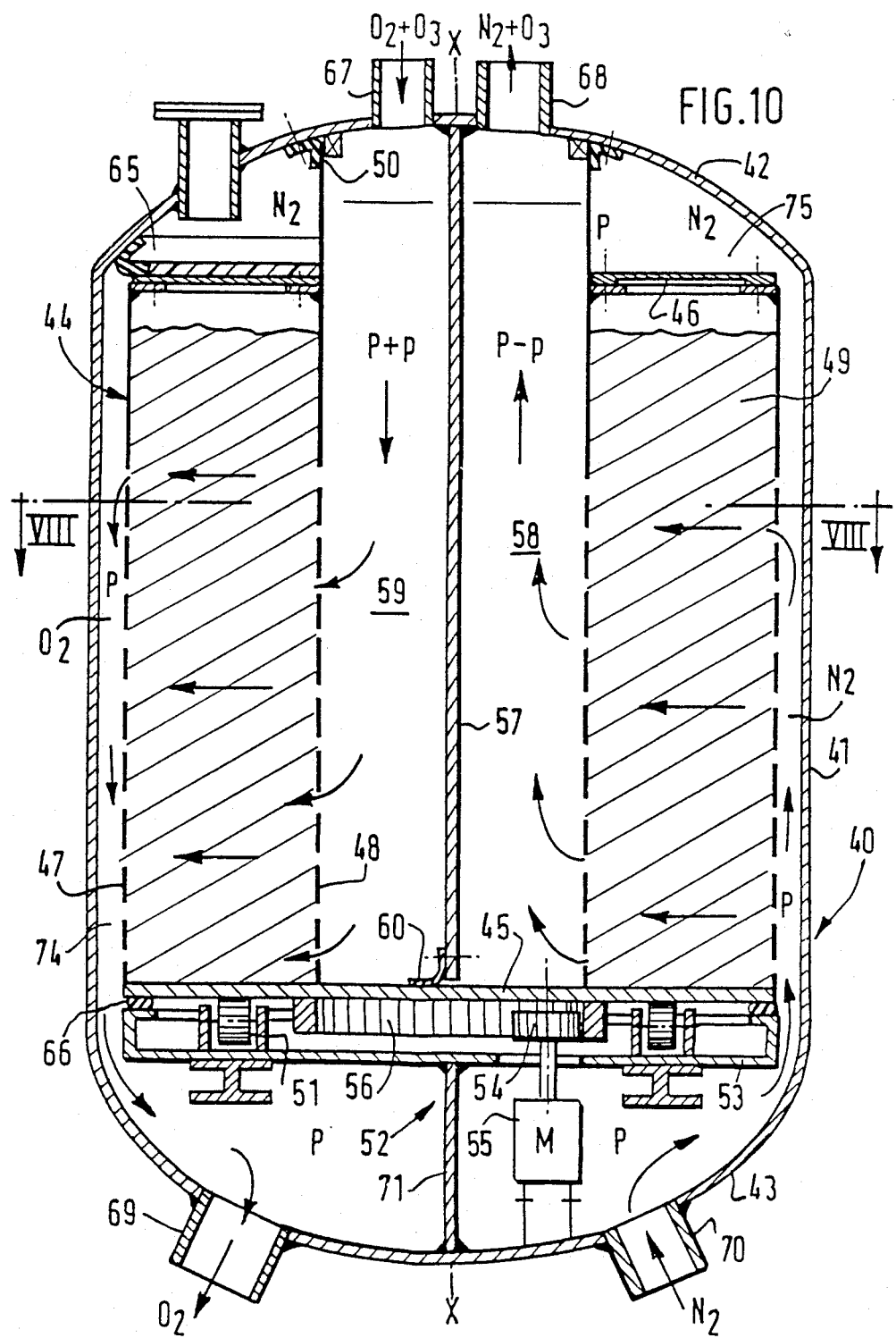
Figure 11:
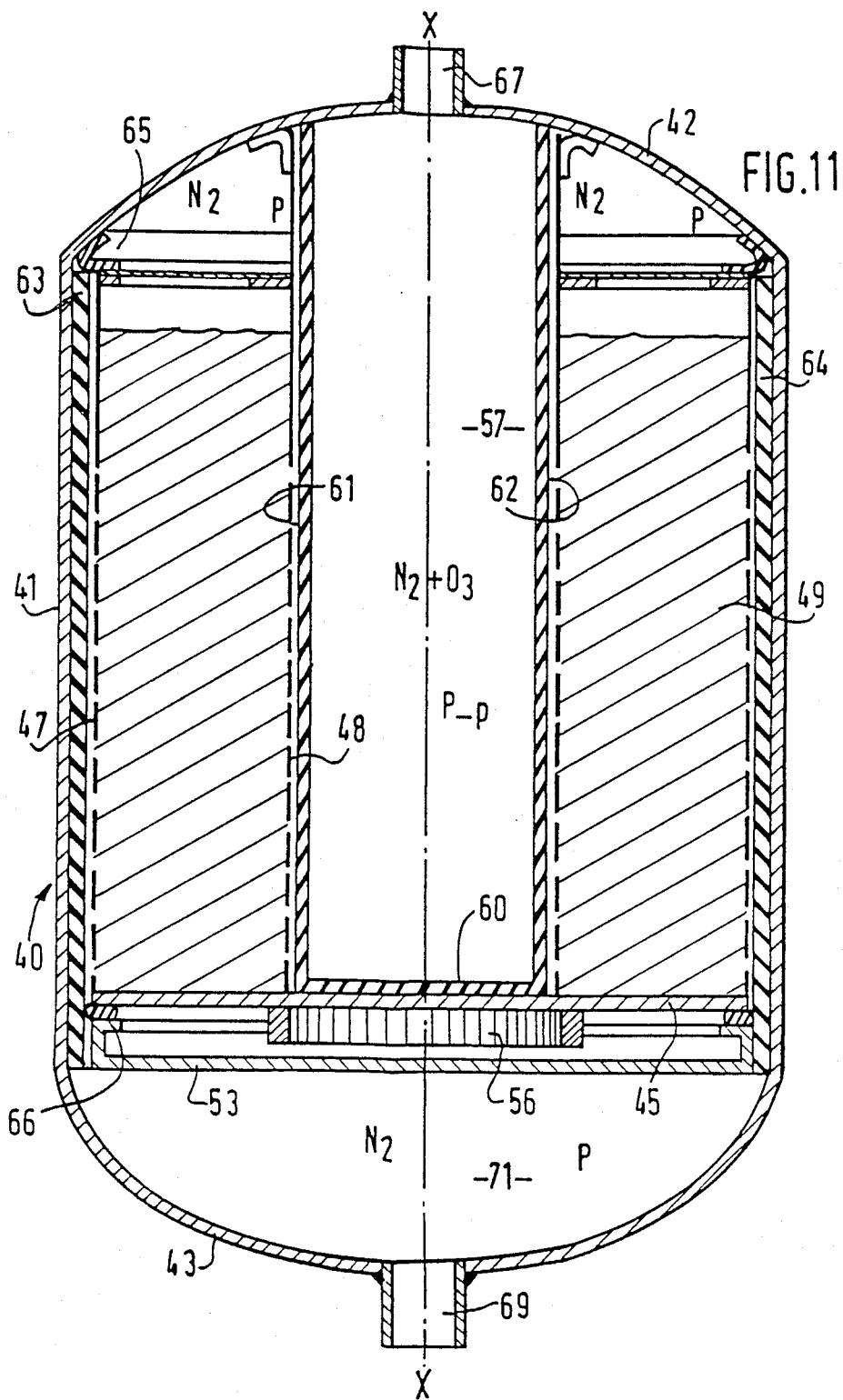
Figure 12:
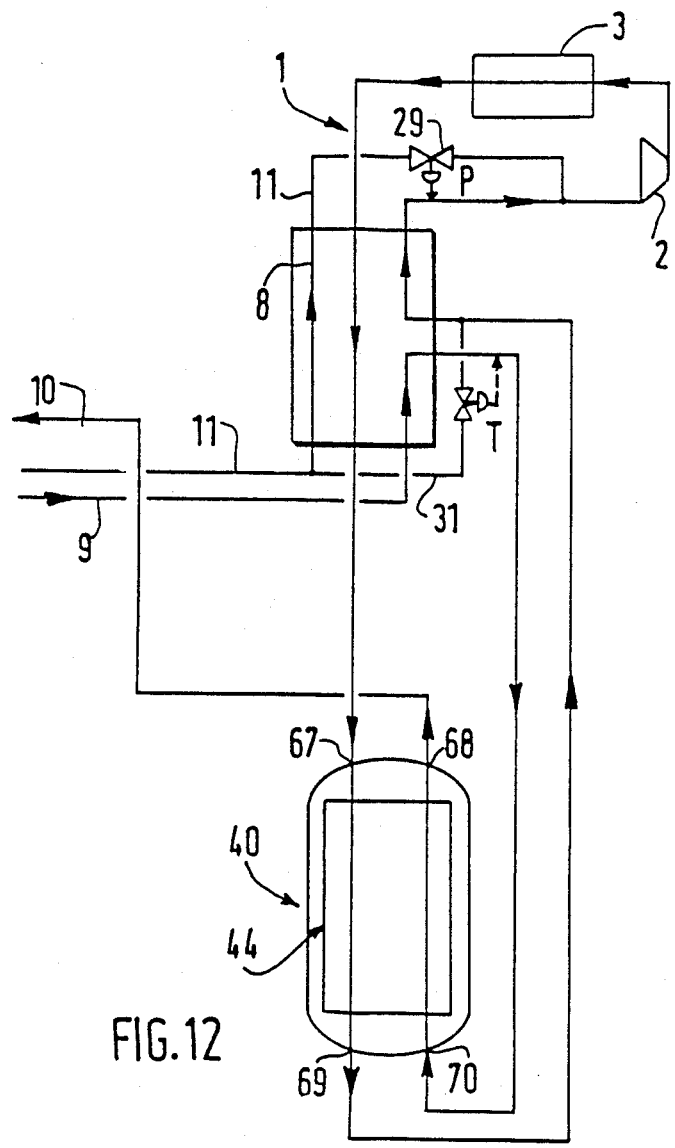
Figure 18:
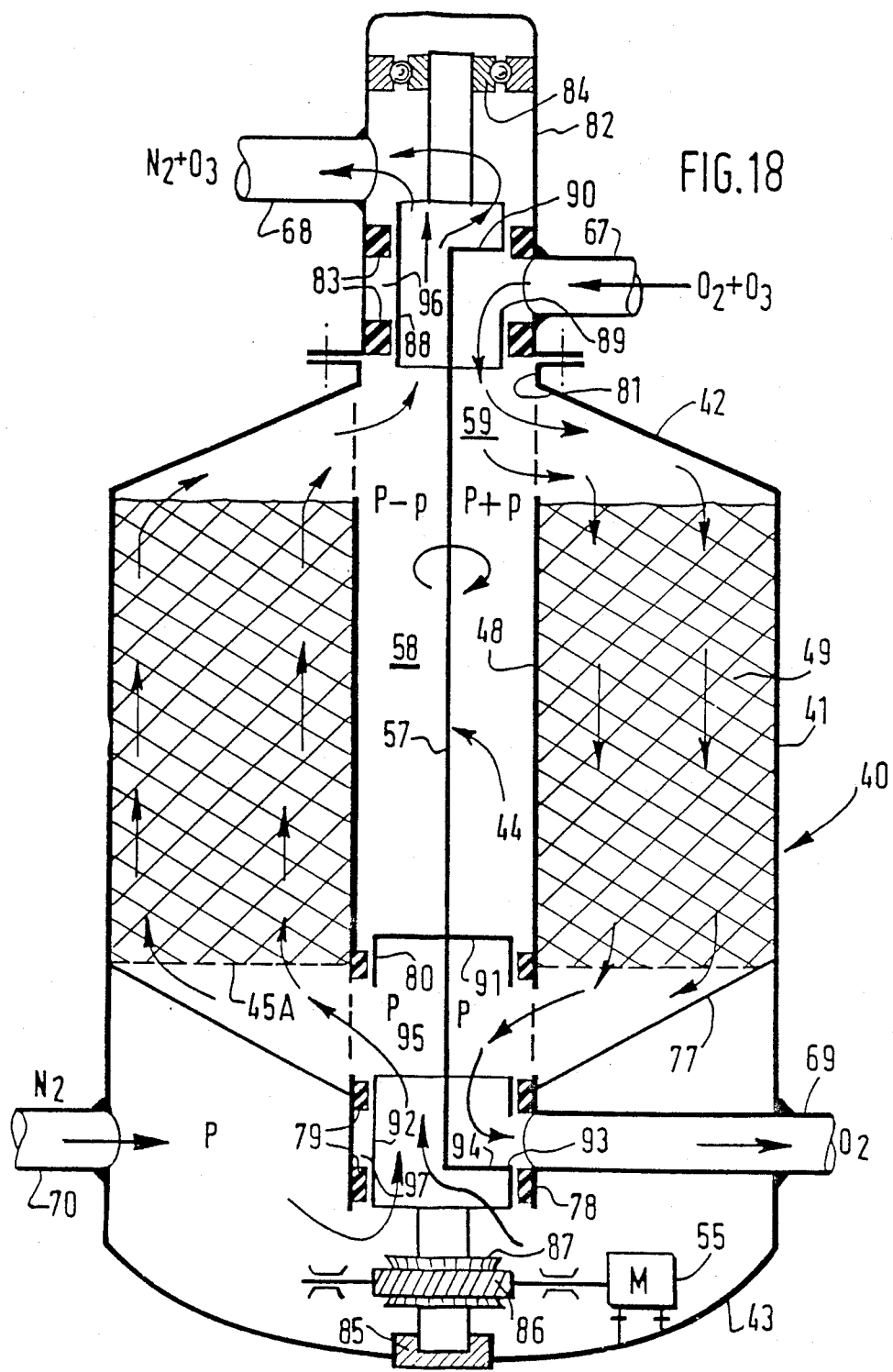

FIGS. 5A and 5B together diagrammatically represent a complete plant corresponding to the diagram of FIG. 3;

FIGS. 6 and 7 repeat in more detail the diagram of FIG. 1 according to two embodiments;

FIG. 8 is a cross-sectional view taken along line VIII—VIII of FIG. 10;

FIG. 9 is a similar view of a modification;

FIGS. 10 and 11 represent the plant of FIG. 8 or of FIG. 9 in a longitudinal section respectively taken along lines X—X and XI—XI of these figures;

FIG. 12 shows the use of an apparatus such as shown in FIGS. 8 to 11 in a plant according to FIG. 6;

FIG. 13 is a longitudinal sectional view of another apparatus for carrying out a process according to the invention;

FIGS. 14 to 17 are sectional views respectively taken along lines XIV—XIV to XVII—XVII of FIG. 13;

FIG. 18 is a view similar to FIG. 13 of a modification;

FIG. 19 is a view similar to FIGS. 13 and 18, of another modification of a plant according to the invention;

FIG. 20 is a cross-sectional view taken on the line XX—XX of FIG. 19; and

FIG. 21 is an enlarged fragmentary cross-sectional view taken on the line XXI—XXI of FIG. 20.

FIG. 1 is a simplified view of a plant for producing ozone from oxygen having a single ozonization loop 1. This plant essentially comprises a "Roots" compressor 2, an ozonizer 3 of any suitable type and three adsorption cylinders 4,5,6 filled with silica gel.

At each instant, oxygen circulates in the loop 1 in the following manner: the oxygen, compressed from 1.3 bars (1 bar=an absolute pressure of $10^5$ Pa) to 1.5 bars by the compressor 2, is partly ozonized by the ozonizer 3, from which issues an oxygen-ozone mixture having about 3% by volume of ozone; this mixture enters, from the bottom, one of the three cylinders, for example the cylinder 4 in which the ozone is trapped by adsorption, the circulatin occurring in a concurrent direction; and the oxygen issuing from the top of the cylinder 4 returns to the compressor.

Further, a carrier or substitution gas, which may be impure nitrogen (mixed with oxygen) or dry air and which will be hereinafter termed "nitrogen" for the sake of convenience, enters through a conduit 9 in a countercurrent manner to another cylinder, for example the cylinder 6, so as to effect the desorption of the ozone, and a mixture of this gas and ozone issues from the cylinder 6 through a conduit 10 and constitutes the production flow.

Meanwhile, the third cylinder (cylinder 5) is purged by a cocurrent scavenging by taking off a part of the oxygen-ozone mixture just before its entry into the cylinder 4; the ozone is trapped in the cylinder 6 and it is a mixture or nitrogen and oxygen which issues from this cylinder; this mixture is combined, through a conduit $100_5$, with the main nitrogen flow of the conduit 9. The loss of gas of the loop 1 due to the production of ozone and to this scavening is compensated for by an addition of oxygen at 11, between the outlet of the cylinder 4 and the inlet of the ozonizer 3. It will be observed that the scavening gas flow at the same time brings about the start of the adsorption stage of the cylinder 5.

In order to improve the adsorption of the ozone without however attaining the risk of this body assuming the liquid and very unstable state, the oxygen-ozone mixture is introduced into the cylinder 4 at a temperature of $-90°$ C., and the oxygen issuing from this cylinder at about $-80°$ C. is put into thermal exchange relation with the mixture issuing from the ozonizer in a heat exchanger 8. The plant requires an addition of cold, which may be supplied in several different ways, as will be described hereinafter.

Figure 2:
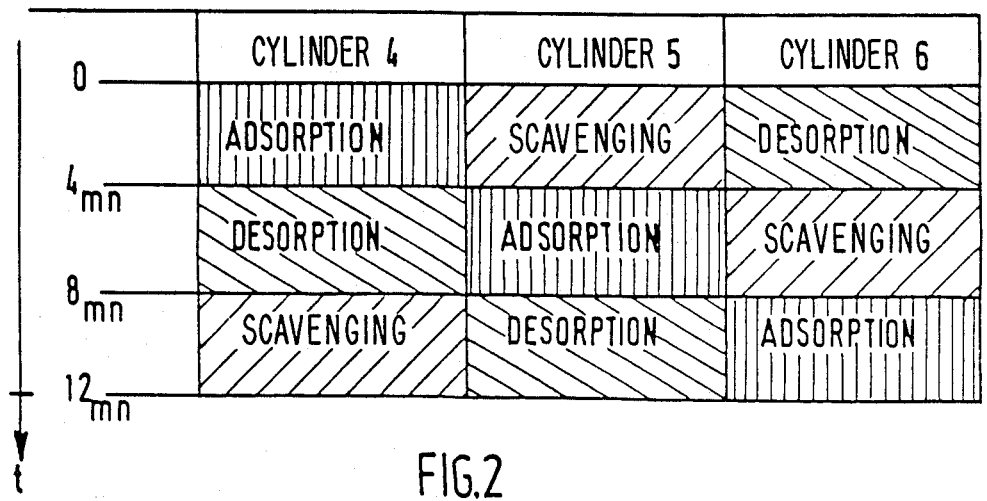
FIG. 2 is a diagram illustrating the operation of this plant.

The plant comprises means (not shown) for switching between the three cylinders 4 to 6, and operates in accordance with the cycle illustrated in FIG. 2: each cylinder operates in succession in cocurrent adsorption (cylinder 4 of FIG. 1), in countercurrent desorption (cylinder 6 of FIG. 1) and cocurrent scavening (cylinder 5 of FIG. 1), and these three stages have the same duration, which is for example 4 minutes.

As an example of an order of magnitude, with roughly the same conditions of pressure and temperature in the three cylinders 4 to 6, if a flow of 1000 $Nm^3/h$ (normal cubic meters per hour) of oxygen is treated by the ozonizer, the nitrogen+production ozone outlet has a flow on the same order, the scavening flow in the cylinder 5 recycled to the cylinder 6, is on the order of 45 $Nm^3/h$, and the addition of oxygen at 7 is on the order of 90 $Nm^3/h$.

As a modification, and as illustrated in dot-dash lines in FIG. 1, the scavening of the cylinder 5 may be effected by means of oxygen issuing from the cylinder 4; this oxygen circulates in a countercurrent manner and is combined, as it leaves the cylinder 5, with the flow of nitrogen charged with ozone issuing from the cylinder 6 in the desorption stage. It will be observed that, in this case, the scavening oxygen is also used for completing the desorption of the cylinder 5.

The plant diagrammatically shown in FIG. 3 is of the modular type, i.e. it comprises a plurality of independent ozonization loops 1A to 1D. This presents important advantages from the point of view of reliability (the arrangement of the loops in individual premises facilitates the loop-by-loop maintenance) and the adaptation to variable needs in ozone. Further, owing to a coupling of all the loops for the desorption and the scavening, the number of adsorption cylinders is reduced from three to two for each loop in the following manner.

Each loop 1A to 1D comprises, as before, respectively, a "Roots" compressor 2A to 2D, an ozonizer 3A to 3D and a heat exchanger 8A to 8D. Associated with each loop are two silica gel cylinders 4A, 5A to 4D, 5D. An inlet manifold 9 of carrier gas, named "nitrogen" as before, an outlet manifold 10 for the nitrogen-ozone mixture, and a supplemental oxygen supply manifold 11. The manifolds 9 and 10 may be respectively and selectively connected to the upper inlet and lower inlet of each cylinder, while the manifold 11 is permanently connected, through four branch pipes 11A to 11D, to the four loops 1A to 1D upstream of the compressor.

This ensures a constant flow of oxygen in the compressor and the ozonizer.

At each instant, four cylinders (here 4A to 4D) operate in cocurrent adsorption, three cylinders (here 5A to 5C) operate in countercurrent desorption by the nitrogen, and one cylinder (here 5D) operates in scavening by taking off the $O_2$-$O_3$ mixture before it enters the associated cylinder 4D. In order to compensate for this scavening, each branch connection of the manifold 11 feeding the four loops feeds to the loop undergoing scavening a corresponding supplemental oxygen flow. The upper inlet of each cylinder may be connected through a conduit, such as $100_{5D}$, to the manifold 9 so as to recover the scavening flow in the carrier gas.

Figure 4:
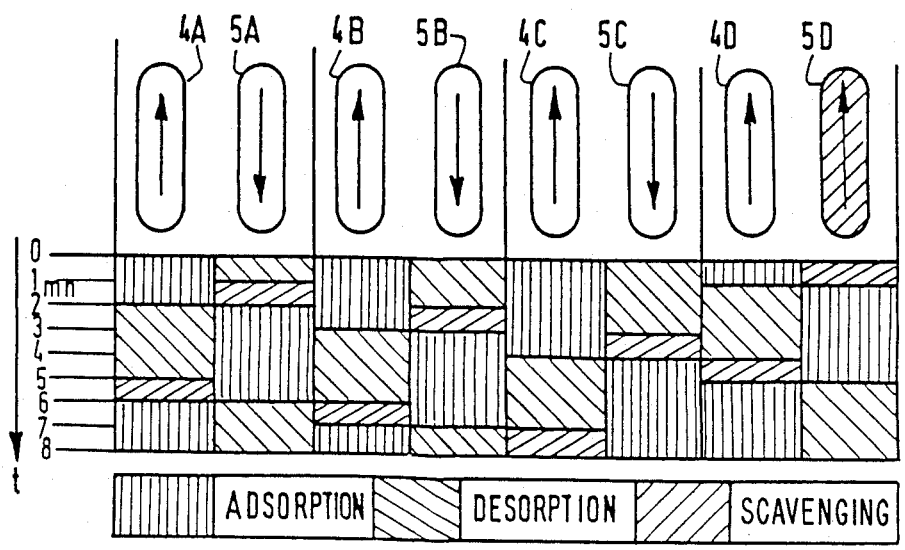
FIG. 4 is a diagram illustrating the operation of the plant of FIG. 3.

The plant includes switching means (not shown) which ensure a cyclic operation of all the cylinders, as illustrated in FIG. 4: in respect of a cycle of 8 minutes, each cylinder ensures in succession a cocurrent adsorption stage of 4 minutes, a countercurrent desorption stage of 3 minutes, and a cocurrent scavenging stage of 1 minute, the nitrogen and scavenging flows being adapted in consequence. The following table summarizes this operation. In the boxes of this table, "A" designates an adsorption stage, "D" a desorption stage, and "B" a scavenging stage.

| Time (min.) | CYLINDER | | | | | | | |
|---|---|---|---|---|---|---|---|---|
| | 1 | 2 | 3 | 4 | 5 | 6 | 7 | 8 |
| 1 | A | D | A | D | A | D | A | B |
| 2 | A | B | A | D | A | D | D | A |
| 3 | D | A | A | B | A | D | D | A |
| 4 | D | A | D | A | A | B | D | A |
| 5 | D | A | D | A | D | A | B | A |
| 6 | B | A | D | A | D | A | A | D |
| 7 | A | D | B | A | D | A | A | D |
| 8 | A | D | A | D | B | A | A | D |

This principle may extend to a plant having n loops: at each instant, n cylinders are operating in the cocurrent adsorption stage, (n−1) cylinders operating in the countercurrent desorption stage, and one cylinder is operating in the cocurrent scavenging stage. If the duration of the adsorption is taken as unity, the scavenging duration is on principle 1/n and, consequently, the desorption duration n−1/n As a modification, it could be envisaged to reduce the scavenging duration and, possibly, correspondingly increase the duration of at least one of the other stages of the corresponding loop.

Returning to FIG. 3, as concerns the flow and with the same overall hypotheses as in FIG. 1, each ozonizer treats 250 $Nm^3/h$ of oxygen, each loop permanently receives an additional supply of 45/4 $Nm^3/h$; and the scavenging, which must be carried out during a period equal to one quarter of the adsorption period, consumes 45 $Nm^3/h$, so that the corresponding branch pipe (here 11D) feeds to the loop 1D a supplemental amount of oxygen of 45 $Nm^3/h$. This scavenging gas is recovered in the manifold 9, and there issues in a countercurrent manner from each of the three cylinders operating in desorption a flow of 1000/3 $Nm^3/h$ of nitrogen-ozone mixture.

In the case of FIG. 3, as in that of FIG. 1, the recovery of the scavenging flow enables the carrier gas flow to be provided to be reduced. If it concerns impure nitrogen, as will be seen hereinafter, in the case where the plant is combined with an air separating apparatus, it is the nitrogen flow which defines the size of this apparatus, and the gain, on the order of 5%, achieved on this flow permits a reduction in the investment and power costs. If this carrier gas is air, it must be dehydrated, which is costly, and the aforementioned recovery also results in a gain.

FIGS. 5A and 5B together represent a complete ozone-producing plant, comprising, on one hand (FIG. 5A), an air separating apparatus adapted for this application and, on the other hand (FIG. 5B), four loops arranged in the same way as in FIG. 3.

The apparatus of FIG. 5A feeds to the four loops of FIG. 5B the supplemental oxygen through the manifold 11, and the carrier nitrogen through the manifold 9. It is also connected to the four loops through the production manifold 10 conducting the nitrogen-ozone mixture. It supplies the whole of the gases and the cold required for the production of ozone.

This apparatus comprises an air compressor 20, a compressed air purifying device 21, a unit comprising a turbine 22 and a booster 23, a thermal exchange line 24 and a distillation column 25. Air, compressed to 4 bars by the compressor 20 and then purified, is compressed to 5 bars by the booster 23 and then cooled from the ambient temperature in the exchange line 24. A large part, for example on the order of one half or more, of the air flow is taken off before reaching the cold end of this exchange line and is turbined at 22, which ensures the maintenance of the cold state of the plant and the mechanical driving of the booster 23. The turbined flow, expanded to 1.4 bars, is introduced into the intermediate zone of the column 25. The rest of the air is cooled to about $-175°$ C., liquified in a condenser-vaporizer at the base 26 of the column, and then expanded to 1.4 bars and injected at the top of the latter.

Thus, the column 25 produces at the bottom oxygen at a purity of between 95% and 99.5% and at the top a residual gas R constituted by nitrogen and 10 to 15% of oxygen. It is this gas which will constitute the ozone-carrying gas and will be named "nitrogen" hereinafter for reasons of convenience. This gas also contributes to the sub-cooling of the air in a heat exchanger 26A associated with the column.

The nitrogen withdrawn from the top of the column is reheated in the exchange line 24 in a countercurrent of air to about $-90°$ C., and then passes into the manifold 9. The nitrogen-ozone production mixture enters at substantially the same level as the exchange line 24 and is re-heated in a countercurrent of air to ambient temperature under about 1.1 bars. The part of the nitrogen taken off the conduit 27 before entering the exchange line passes completely through the latter and is used for the regeneration of the cylinders of adsorbent of the purifying device 21.

FIG. 5B shows the elements of FIG. 3, with in more detail heat exchangers 8A to 8D and means for circulating the gases, which are to be found in all the loops.

The nitrogen manifold 9 is in fact split into a first manifold $9_1$ and a second manifold $9_2$. In respect of each loop, for example the loop A, a branch pipe $9_{1A}$ *heats the nitrogen up to about* $-90°$ C. in the exchanger 8A in a countercurrent of the mixture $O_2$-$O_3$, then communicates with the manifold $9_2$, whence the nitrogen can be distributed in the three cylinders operating in desorption (here 5A to 5C) through branch pipes $9_{2A}$ to $9_{2C}$, and then issue through branch pipes 10A to 10C from the manifold 10.

The oxygen manifold 11 has two branches: a branch $11_1$, controlled by a valve 28 at constant flow, from which extend four branch pipes $11_{1A}$, . . . leading to each loop just upstream of the corresponding compressor 2; and a branch $11_2$ from which extend four branch pipes $11_{2A}$, . . . controlled by valves 29A controlled by the pressure of the corresponding loop and also leading to a point just upstream of the corresponding compressor 2.

With reference to the loop 1A, the oxygen-nitrogen mixture issuing from the ozonizer 3A is cooled to $-90°$ C. in travelling throughout the length of the exchanger 8A in countercurrent with oxygen from cylinder 4 (down to $-80°$ C.) then with the nitrogen produced by the column 25 (from $-80°$ C. to $-90°$ C.), passes through the cylinder (here 4A) operating in adsorption, issues from the cylinder at around $-80°$ C., enters at this temperature the exchanger 8A, is heated therein in a countercurrent of the oxygen-ozone mixture, and returns to the ambient temperature at the compressor 2A.

As seen before, three loops comprise a cylinder operating in the desorption stage with nitrogen, while the fourth loop (here 1D) comprises a cylinder (here 5D) operating in the scavenging stage. For this purpose, the oxygen-ozone mixture is taken off the loop before entering the cylinder 4D in the adsorption stage and passes through in a cocurrent manner the cylinder 5D, and then leads through the conduit $100_{5D}$ to a recovering manifold 100.

The latter leads to the manifold $9_2$ through a valve 30 at constant flow adjusted to the same flow as the valve 28. Thus, at each instant, the scavenging flow is compensated for by an equal flow injected into the loop through the corresponding branch pipe $11_1$ (here $11_{1D}$), and any possible difference in the flows is copensated for by the intervention of the corresponding valve 29 (here 29D) which returns to the set value the pressure of the loop at the entrance of the "Roots" compressor (here 2D).

FIG. 5B also shows all of the connecting conduits and electrovalves which permit the circulation of the gases and the permutation of the functions of the cylinders, in the way explained hereinbefore. There has also been illustrated, in respect of each loop, an oxygen by-pass 31; with the latter, a cold flow of oxygen may avoid the exchanger 8A, . . . in order to effect a temperature regulation, this flow being controlled by the temperature of the nitrogen issuing from the exchanger.

When the plant is in a permanent operating condition, it has been seen that the required additional supply of oxygen is relatively small, while the nitrogen flow is on the same order of magnitude as the flow in the loops. It is usually this nitrogen flow which determines the size of the air-separating apparatus.

In order to reduce this nitrogen flow and consequently to reduce the investment and power costs, it might be considered to use for the desorption stage either warmer nitrogen or nitrogen at a lower pressure (relative to the pressure of the adsorption stage). However, the first solution is to be avoided owing to the short duration of the various stages which does not allow the temperature to be acted upon. Thus, there remains a second solution which may be employed by increasing the operating pressure of the ozonizers, the desorption pressure being fixed by the pressure of utilization of the nitrogen-ozone mixture (here about 1.1 bars). As a modification, the desorption pressure may also be reduced by placing a compression machine in the conduit 10 which discharges at the desired utilization pressure. For an ozone content of 3 to 5% molar, there could thus be employed an adsorption pressure of 1.1 to 2.5 bars and a desorption pressure of between 0.5 and 1.5 bars. Another possible advantage of the desorption at a pressure lower than that of the adsorption is a higher concentration of ozone in the production gas $R+O_3$ substantially increased in the inverse ratio of the absolute pressures.

FIGS. 6 and 7 illustrate other arrangements for supplying cold to the adsorption cylinders, the choice depending on the various parameters of each application, for example on the length of the connection conduits between the air-separating apparatus and the site of the ozonization loops. These two arrangements have been shown in the case of a plant having a single loop corresponding to the diagram of FIG. 1 coupled with the air-separating apparatus of FIG. 5A. In FIG. 6, there are shown the loop 1 with the "Roots" compressor 2, the ozonizer 3, the three adsorbent cylinders 4 to 6, the heat exchanger 8, and the nitrogen manifold 9, the nitrogen-ozone mixture manifold 10, and the supplemental oxygen manifold 11.

In this case, as there is only a single ozonization loop, the manifold 9 is not split into two; the nitrogen is merely heated up to about $-80°$ C. in the exchanger 8 and then sent to the cylinder operating in desorption (here 6), and the nitrogen-ozone mixture is recovered through the manifold 10. The oxygen-ozone mixture circulating in the loop passes through the cylinder operating in adsorption (here 4) and enters the exchanger 8 at the temperature level (about $-80°$ C.) from which issues the desorption nitrogen, then is heated up to the ambient temperature and sent to the compressor 2. It is the beginning of the scavenging taken from the loop which passes through the third cylinder (here 5), through a manifold 32 and a branch pipe $32_5$ and is recovered through a conduit $100_5$ in the manifold 9, downstream of the exchanger 8. The three conduits $100_4$, $100_5$, and $100_6$ are joined together to form the recovery manifold 100 controlled by the constant flow valve 30.

As the manifold 9, the manifold 11 has a single branch. The supplemental oxygen issues from the exchange line 24 of FIG. 5A at the same temperature level as the nitrogen, namely about $-90°$ C., as indicated in dot-dash lines at 11A in FIG. 5A, and is heated up to the ambient temperature in the exchanger 8, in countercurrent manner with the oxygen-nitrogen mixture, before being injected into the loop 1 through the valve 29 controlled by the pressure of this loop. There is also provided a temperature-regulating by-pass 31.

The embodiment shown in FIG. 7 differs from the preceding embodiment in that the cooling of the oxygen-nitrogen mixture of the loop 1 is completely achieved in a countercurrent manner by the supplemental oxygen, which is fed through the manifold 11 in the gaseous form but at its dew point, namely about $-175°$ C., as indicated in dot-dash lines at 11B in FIG. 5A, and even in the liquid state, and injected into the loop at the cold end of the exchanger 8. In this case, the nitrogen is extracted from the exchange line 24 directly at the desorption temperature, namely about $-80°$ C. In order to avoid the risk of a liquid phase rich with ozone appearing at the point of injection of the oxygen, the supplemental supply of cold gas has been effected not directly in the oxygen-ozone mixture before its introduction into the adsorber 4, but into the fluid issuing from the latter, and therefore in a fluid having a very low concentration of ozone.

The process just described permits the obtainment, in a flow of substitution gas maintained constant, an ozone content which is practically constant from the beginning to the end of the desorption stage, with however a slight regular drop in this content which is a function of the dimensioning of the adsorbers and of the duration of the stages. The arrangement having n ozonization loops (FIG. 3 and FIG. 5B) results, owing to the offset with respect to time in the operation in the desorption phase of the cylinders of the various loops, in a reduction in the ratio n of the drop in the ozone content as compared to a plant having a single loop. If the user is interested, not so much in a constant content, but in a constant quantity of delivered ozone, the process enables this constancy of the production to be ensured by modulating the flow of substitution gas in the course of the desorption stage so as to compensate for the slight drop in the content by a substantially proportional increase in the flow.

It is also possible to use the same property of the system, namely the permanent presence of a massive ballast of ozone in the adsorbers, for accommodating an instantaneous increase in the demand for ozone; it is sufficient to instantaneously increase the substitution gas flow sent to the desorption stage to increase substantially in the same proportions the production of ozone; of course, the production of ozone in the ozonizer will be simultaneously increased by increase in the flow of oxygen having a constant ozone content or by an increase in the ozone content for a constant oxygen flow, depending on the preferred regulating mode, but the fact of withdrawing from the ozone ballast permits an instantaneous response to the demamd without awaiting the time of a cycle. The same is true upon a decrease in the demand for ozone. If the ozonizer is acted upon by varying the flow of oxygen having a constant ozone content, the new equalization manner of operating will be obtained with a substitution gas having an unchanged content but with a modified flow so long as the demand does not again vary.

On the other hand, if the ozonizer is acted upon by varying the ozone content with an unchanged oxygen flow, the new equalization manner of operating will be obtained with a substitution gas having a modified ozone content but with an unchanged flow; the flow would have been modified only temporarily, during the time for reconstituting in the adsorbers the ozone ballast corresponding to the new manner of operating.

Note that the association of an air distillation apparatus and an ozone-producing plant permits the adsorption of the ozone in an optimum temperature range (about $-50°$ C. to $-110°$ C.) less than those which may be attained by means of commercially-available industrial refrigerating machines.

Apparatus for carrying out the process described hereinbefore will now be described by in particular taking advantage of the specific features of these processes: adsorption pressure in the region of the desorption pressure; possibility of adding oxygen to the nitrogen-ozone production mixture (the sole drawback being the cost of oxygen thus lost for the ozonization loop), but the necessity to avoid allowing the entry of notable amounts of nitrogen into the ozonization loop so as to avoid progressively enriching the latter with nitrogen up to beyond a limit value acceptable for the good operation of the ozonizer.

The apparatus shown in FIGS. 8, 10 and 11 comprises an outer case 40 formed by a cylindrical sleeve 41 having a vertical axis X—X and an upper curved convex end wall 42 and a lower curved convex end wall 43 in which is coaxially mounted a rotary unit 44. The latter comprises a horizontal lower support 45 in the form of a circular plate, an annular upper cover 46 and an outer cylindrical grate 47 and an inner cylindrical grate 48 between which is disposed an annular bed 49 of adsorbent material. The grate 47 connects the outer peripheries of the support 45 and of the cover 46, while the grate 47 extends through the central opening of this cover and is rotatively guided at its upper end by a sealed rolling bearing 50 connected to the end wall 42 of the case.

The two grates are perforated throughout their height except in their upper part beyond a level located a little below the cover 46. The support 45 is mounted on a circular roller bearing 51 carried by the lower end wall 43 of the case through a metal framework 52 comprising a floor 53. The unit 44 can be driven in rotation about the axis X—X by a gear wheel 54 connected to a motor 55 located inside the case and driving a ring gear 56 fixed under the support 45.

A radial partition wall 57 divides the inner space of the grate 48 into two semi-spaces 58,59. This partition wall is fixed to the upper end wall 42 and rubs, on one hand, along its lower edge against the support 45 through a sealing scraper 60, and, on the other hand, along each longitudinal edge, against the grate 48 through two sealing scrapers 61,62 (FIGS. 8 and 11).

Further, the space between the rotary unit 41 and the case 40 is divided into two parts in the following manner.

On one hand, there are provided throughout the height of the unit 44, from the cover 46 to the fixed floor 53, two radial partition walls (FIG. 8): a radial partition wall 63 which is coplanar with the partition wall 57, and another radial partition wall 64 which is angularly offset by an acute angle in the counter-clockwise direction (as viewed in FIG. 8) relative to the position diametrically opposed to the partition wall 63. Each of the partition walls 63 and 64 is secured by its outer edge to the sleeve 41 and rubs against the grate 47 through a sealing scraper.

On the other hand, there are provided two sealing elements each of which extends in a horizontal plane to the extent of a little more than a semi-circle from the partition wall 63 to the partition wall 64. The upper sealing element 65 is fixed to the upper end wall 42 of the case and rubs against the outer periphery of the cover 46, while the lower sealing element 66 is fixed to the upper side of the floor 53 and rubs against the outer periphery of the support 45.

For the distribution of the gases, the top of the upper end wall 42 has two orifices 67,68 which communicate with the interior of the grate 48 on each side of the partition wall 57, while the lower end wall 43 has two orifices 69,70 which open onto the support 45 on each side of a radial partition wall 71 which is part of the framework 52. The bed of adsorbent 49 is moreover divided into multiple sectors 72 (thirty-two sectors in the illustrated embodiment) by radial plates 73 (FIG. 8) interconnecting the two grates.

Thus, the space between the unit 44 and the case 40 is divided in a sealed manner into a semi-space 74 which communicates solely with the orifice 69 and, through part of the sectors 72 of the adsorbent bed, with the orifice 67, and a semi-space 75 which communicates solely with the orifice 70 and, through another part of the sectors 72, with the orifice 68.

This apparatus is used in the following way for carrying out a process similar to that illustrated in dot-dash lines in FIG. 1, the apparatus replacing the three cylinders illustrated in this figure.

The orifice 67 is connected to the loop 1, downstream of the heat exchanger 8, so that it is permanently fed with the oxygen-ozone mixture cooled by this exchanger. The orifice 68 is connected to the production gas conduit 10. The orifice 69 is connected to the loop 1, upstream of the return in the exchanger 8. The orifice 70 is connected to the nitrogen supply conduit 9. The unit 44 is driven in rotation at constant speed in the clockwise direction shown in FIG. 8.

It will be assumed that the oxygen at the orifice 69 and the nitrogen at the orifice 70 are substantially at the same pressure P, for example slightly higher than atmospheric pressure. Bearing in mind a pressure drop p, for example on the order of 30 mb, when passing through the bed 49, there will be had a pressure $P+p$ at the orifice 65 and $P-p$ at the orifice 68, which determines the directions of circulation of the gases.

The partition walls 57, 63 and 64 (FIG. 8) divide the sectors 72 into three categories:

from the partition wall 63 to the diametrically opposed place 76, in turning in the counterclockwise direction, the oxygen-ozone mixture travels radially through the half of these sectors carrying the reference numeral $72_1$ from the interior toward the exterior, which has its ozone content progressively decreased owing to the adsorption and allows pure oxygen to emerge into the outer semi-space 74;

from the same partition wall 63 to the partition wall 64, in turning in the clockwise direction, nitrogen passes through a little less than the remaining half of the sectors 72, carrying the reference numeral $72_2$, from the exterior to the interior, which becomes progressively enriched with ozone and delivers to the confronting inner semi-space 58 a nitrogen-ozone mixture constituting the product of the plant;

a sector 72, or a small number of sectors 72 (two thereof carrying the reference numerals $72_3$ and $72_4$ in FIG. 8) located between the partition wall 64 and the place 76. This sector or these sectors are fed from the exterior with the oxygen of the space 74 which becomes progressively enriched with ozone and scavenges the still present nitrogen so that they deliver an oxygen-ozone-nitrogen mixture to the central semi-space 58 which communicates with the orifice 68.

Thus, if there is considered a given sector 72, turning through a complete turn from the place 76:

from this place 76 to the partition wall 63, this sector undergoes a stage of adsorption of the ozone of the cooled oxygen-ozone mixture coming from the heat exchanger 8 (FIG. 1) and introduced into the central semi-space 59 through the orifice 67;

from the partition wall 63 to the partition wall 64, the same sector 72 is desorbed in countercurrent manner (that is, radially from the exterior to the interior) by the nitrogen introduced into the outer semi-space 75 through the orifice 70;

from the partition wall 64 to the place 76, this sector 72 undergoes a countercurrent scavenging by the oxygen, this oxygen completing moreover the desorption stage of this sector.

Considering all the N sectors 72, there are at each instant N/2 sectors in adsorption, n sectors in scavenging-desorption (number of sectors between the partition wall 64 and the place 76) and (N/2)-n sectors in desorption. The plant thus permanently delivers a constant flow of mixture essentially constituted by nitrogen and ozone with no need for a switching valve.

As will be understood, it is possible to regulate the relative duration of each adsorption stage, desorption stage and scavenging-desorption stage by the choice of the angular offset between the partition wall 64 and the plane of the partition walls 57 and 63, and the absolute same duration of each stage by the choice of the speed of rotation of the unit 44.

It will be observed that the rolling bearings 50 and 51 and the gear wheel 54 and its driving motor 55 are completely contained in the semi-space 75, and consequently in a nitrogen atmosphere, which is advantageous for their good operation and safety.

The embodiment shown in FIG. 9 differs from that shown in FIG. 8 only in that the partition wall 64 is angularly offset in the clockwise direction with respect to the place 76. Consequently, the sector or sectors $72_3, 72_4$ between the place 76 and the partition wall 64 are in the cocurrent scavenging stage (radially from the interior to the exterior) by the oxygen-ozone mixture coming from the central semi-space 59, and the oxygen-nitrogen mixture which issues therefrom reaches the outer semi-space 75 and is mixed with the nitrogen which is fed to the latter so as to participate with this nitrogen in the countercurrent desorption of the N/2 sectors between the partition wall 63 and the place 76.

Thus it will be understood that the apparatus shown in FIG. 9, by replacing the three cylinders 4 to 6 of FIG. 1, enables the process illustrated in full lines in FIG. 1 to be carried out with no need for a switching valve.

This simplification of the plant, which results in a considerable reduction in the risks of leakages, is represented in FIG. 12 which again uses by way of example the diagram of FIG. 6 with the same reference numerals, but uses the apparatus having a rotary adsorbent bed in the manner explained hereinbefore.

The apparatus shown in FIGS. 13 to 15 is based on the same general principle as those shown in FIGS. 8 to 11, and the corresponding elements carry the same reference numerals: an annular adsorbent bed 49 defined by an outer grate 47 and an inner grate 48 is divided into N sectors 72 by radial plates 73 extending between these two grates, and each of these sectors is put successively in communication with an oxygen-nitrogen mixture supply, with a nitrogen supply, and with a scavenging gas supply which is oxygen in the illustrated embodiment. The essential difference resides in that fact that, now, the bed 49 is fixed while the apparatus comprises a rotating core constituting the rotary unit 44 which ensures the desired distribution of the three gases between the sectors 72.

More precisely, the case 40 has in its lower part a double downwardly-convergent end wall 77 which terminates at its lower end in an open cylinder 78. A pipe constituting the orifice 69 extends radially from this cylinder and through the sleeve 41 with a sealed joint, and two annular sealing elements 79 are fixed in the cylinder 78 above and below this pipe. The orifice 70 opens into the space between the lower end wall 43 and the double end wall 77.

The two grates 47 and 48 are interconnected at their top by the upper end wall 42 and at their bottom by the support 45 which is here roughly frustoconical and parallel to the double wall 77. The inner grate 48 is downwardly extended to the cylinder 78 and an annular sealing element 80 is fixed in the grate 47 in the region of the connection between the latter and the support 45. Further, the plates 73 are outwardly extended to the end wall 42, to the sleeve 41 and to the double wall 77 so that it is all of the space defined by the grate 47, the end wall 42, the sleeve 41 and the double wall 77 which is divided into N sectors, as shown in FIGS. 14 and 15.

The case 40 has an opening 81 at its top of the same diameter as the grate 48 and on which is fixed a cylindrical dome 82 which has the same diamater, and is closed at its top and open at its base. Two pipes, respectively constituting the orifices 67 and 68, open radially onto the lower part and onto the upper part respectively of the dome 82. Two annular sealing elements 83 are fixed in the dome respectively between the two pipes 67 and 68 and below the pipe 67.

The rotary core 44 is guided by an upper rolling bearing 84 provided at the top of the dome 82 and by a lower rolling bearing 85 provided at the lower point of the end wall 43. It is driven in rotation by a motor 55 secured to the end wall 43 inside the case 40 through a worm 86 which is engaged with a worm wheel 87 fixed to the core.

Close to each end, the core 44 has a cylindrical plug valve open at both ends. The upper plug valve 88 cooperates by its end parts with the two sealing elements 83 and presents therebetween a semi-circular slot 89 whose upper edge is connected to the periphery of a horizontal plate 90 in a half moon shape (FIG. 16). Depending from the rectilinear and diametrical edge of this plate 90 is a diametrical vertical partition wall 57 whose width is equal to the inside diameter of the plug valve 88. Throughout the height of the grate 48, the partition wall 57 carries two scrapers 61,62 which rub against this grate (FIG. 14) so as to define two inner semi-spaces 58 and 59. At its lower end, the partition wall 57 carries an inverted cup-shaped closure member 91 whose peripheral wall cooperates with the sealing element 80. The lower plug valve 92 cooperates by its end parts with the two sealing elements 79 and presents therebetween a slot 93 whose lower edge is connected to the periphery of a horizontal plate 94 in vertical alignment with the plate 90.

As can be seen in FIGS. 15 and 17, the plate 94 has a shape extending a little beyond a half-moon and is limited by two radii making an obtuse angle therebetween. One of these radii is in the plane of the partition wall 57 and the other is offset by an acute angle in the clockwise direction (as viewed in FIGS. 14, 15 and 17) with respect to the diametrically opposed radius, this offset corresponding to a small number of sectors n with n=2 in the illustrated embodiment. A partition wall 95 forming a dihedron of the same angle vertically extends between these radii and the lower face of the closure member 91. Between the upper sealing element 79 and the sealing element 80, this partition wall 95 rubs by its two edges, provided with sealing scrapers, against the lower extension of the grate 48.

Each plug valve 88,92 defines an annular space, respectively 96,97. with the cylindrical wall 82,78 which surrounds it.

In operation, the orifices 67 to 70 are connected, as shown in FIGS. 8 to 12, and the core 44 is driven in rotation in the clockwise direction of FIGS. 14 and 15. The oxygen ozone mixture arrives through the pipe 67 and enters the space 59 through the slot 89 and possibly the space 96. Thence, this mixture travels through N/2 sectors $72_1$ (FIG. 14) and oxygen issues from the corresponding compartments 98 located outside the grate 47. This oxygen gathers below the closure member 91 inside the lower extension of the grate 48 and, owing to the shape of the partition wall 95, is redistributed among (N/2)+n sectors $72_1, 72_3, 72_4$.

Thus a part of the oxygen again passes through in the opposite direction, i.e. toward the axis X—X, n sectors $72_3$ and $72_4$ (FIG. 14) and the main part of the oxygen issues through the pipe 69 via the slot 93 and possibly the annular space 97 from the lower plug valve 92.

Stimultaneously, the nitrogen introduced through the pipe 70 travels upwardly through the plug valve 92, enters the remaining (N/2)−n compartments 98 and, thence travels through the corresponding sector $72_2$ toward the axis X—X and is discharged through the pipe 68 in the form of a nitrogen-ozone mixture (with a little oxygen) after having travelled upwardly through the upper plug valve 88.

It will be understood that, as in the case of FIGS. 8, 10 and 11, each sector 72 undergoes in succession a stage of adsorption of the ozone of the oxygen-ozone mixture, a stage of countercurrent desorption by the nitrogen, and a stage of countercurrent scavenging by the oxygen, this oxygen at the same time completing the desorption and being included in the production gas mainly constituted by nitrogen and ozone. It will be understood that the embodiment shown in FIG. 9 would be found by inverting the direction of the offset of the two parts of the partition wall 95, as illustrated in dot-dash lines in FIG. 15.

FIG. 18 illustrates an apparatus quite similar to that shown in FIGS. 13 to 17 but differs therefrom only in the fact that the bed of adsorbent 49 is of the "flat" type, i.e. having an axial flow, instead of being the radial flow type. For this purpose, the apparatus is modified in the following manner: the outer grate 47 is eliminated, and the support 45 is replaced by a horizontal grate support 45A extending from the grate 48, at the level of the sealing element 80, to the sleeve 41. The bed 49 extends roughly to the top of the latter and, throughout the height of this bed, the grate 48 is solid. The apparatus operates in the same way as that of FIGS. 13 to 17, except that the gases travel vertically through the bed 49.

Likewise, the principle of the rotary bed illustrated in FIGS. 8 to 11 can be applied to the case of a "flat" adsorbent bed as shown in FIGS. 19 to 21.

In this embodiment, the rotary unit 44 comprises two cylindrical metal sheets 47A,48A defining an annular space in which is disposed the adsorbent bed 49 which fills it up to a short distance from the top thereof. This annular space is closed at the base thereof by a grate-support 45A and is upwardly open. The space inside the inner sheet 48A is closed at both ends by an upper solid disk 99 and a lower solid disk 100.

Further, the annular space containing the bed 49 is, as before, divided into N sectors 72 by radial plates 73 extending throughout its height and from one sheet to the other. Fixed on the upper edge of each partition wall 73 is a rounded member 101 (FIG. 21) which imparts a T-section thereto. The unit 44 bears on a circular rolling bearing 51, at least one of the rollers of which is driven by a motor (not shown).

For the purpose of separating the spaces containing the various gases and distribute the gases between the sectors 72, there are provided:

two annular sealing elements 102 respectively fixed to the top and bottom of the sleeve 41 and rubbing against the upper and lower portions of the outer sheet 47A;

a diametrical partition wall 103 extending from the upper end wall 42 down to the vicinity of the unit 44; this partition wall carries at its lower end, throughout its length, a sealing scraper 104 which cooperates with the disk 99 and the upper sealing element and, in turn, with all the rounded members 101 (FIG. 21) during the rotation of the unit 44;

a lower partition wall 105 extending upwardly from the lower end wall 43 to the vicinity of the unit 44. This partition wall is, in one half of its length, in the same plane as the partition wall 103 and, in the other half of its length, in a plane offset from this plane by an acute angle corresponding to n sectors $72_3, 72_4$, in the counterclockwise direction of FIG. 20. In the illustrated embodiment, there has been chosen n=2. The partition wall 105 carries throughout its length on its upper edge a sealing scraper 106 which rubs against the grate 45A, against the lower disk 100 and against the lower sealing element 102.

The orifices 67 and 68 open onto opposite sides of the partition wall 103, while the orifices 69 and 70 open onto opposite sides of the partition wall 105.

In operation, the unit 44 is driven in rotation in the clockwise direction. As before, the oxygen ozone mixture enters the apparatus through the orifice 67, passes downwardly through N/2 sectors $72_1$ in the adsorption stage and essentially issues through the orifice 69 in the form of pure oxygen. The nitrogen enters the orifice 70, passes upwardly through (N/2)−n sectors $72_2$ in the desorption stage and issues through the orifice 68 in the form of the production mixture essentially constituted by nitrogen and ozone. A part of the oxygen is sent upwardly through the remaining n sectors $72_3, 72_4$ for completing the desorption of these sectors and effecting the scavenging. Here again, by offsetting in the other direction the half of the partition wall 105, it will be possible to effect a countercurrent scavenging (downwaardly) of the n sectors $72_3, 72_4$ by the oxygen-ozone mixture, the resulting oxygen being combined with the desorption nitrogen.

It will be observed that in all of the embodiments described hereinbefore, the space containing the nitrogen is adjacent to that containing the oxygen, these two spaces (for example the spaces 75 and 74 of FIGS. 8 to 11) being substantially at the same pressure P. Consequently, there is a minimum risk of leakages of nitrogen in the oxygen of the ozonization loop. Likewise, the other two spaces containing respectively the oxygen-ozone mixture and the production mixture are adjacent to each other, the first (space 59 of FIGS. 8 to 11) being at the maximum pressure P+p and the second (space 58 of FIGS. 8 to 11) being at the minimum pressure P−p. Consequently, a small loss of oxygen of the loop may occur but, here again, the nitrogen cannot pass into this loop.

We claim:
1. An apparatus for producing ozone, comprising
a case (40) containing an annular bed (49) of adsorbent material, the annular bed (49) occupying less than all the interior of the case (40), thereby to leave a volume between the annular bed (49) and the case (40);

means (73) dividing the annular bed (49) into a plurality of sectors (72);

partition walls (53, 57, 63 to 66, 71; 57, 88, 91, 92, 95; 102, 103, 105) dividing said volume between the annular bed (49) and the case (40) into four spaces (59, 74, 75, 58) respectively communicating with a first oxygen-ozone mixture inlet orifice (67), a second oxygen outlet orifice (69), a third substitution gas inlet orifice (70) and a fourth outlet orifice (68) of a production gas consisting essentially of the substitution gas and ozone, these partition walls putting said first orifice (67) in communication with an upstream side, with respect to adsorption, of a first group ($72_1$) of said sectors (72), said second orifice (69) with a downstream side, with respect to adsorption, of a second group ($72_1, 72_3, 72_4$) of said sectors (72) constituted by said first group of sectors ($72_1$) and a third group of said sectors ($72_3, 72_4$) adjacent to said first group ($72_1$), said third orifice (70) with an upstream side, with respect to countercurrent desorption, of a fourth group of said sectors ($72_2$) constituted by the remaining said sectors, and said fourth orifice (68) with a downstream side, with respect to desorption, of said fourth and third groups of sectors ($72_2, 72_3, 72_4$); and means (51; 55) for effecting a relative rotation between the annular bed (49) and said partition walls in such direction that each said sectors (72) is in succession and cyclically part of said first, fourth and third groups.

2. An apparatus according to claim 1, including means mounting the adsorbent bed (49) rotatively in the case (40) and means stationarily fixing the partition walls.

3. An apparatus according to claim 1, including means stationarily fixing the adsorbent bed (49) and means mounting the partition walls rotatively in the case (40).

4. An apparatus according to claim 3, in which the partition walls constitute a core (44), means mounting said core (44) rotatively at the center of the adsorbent bed (49), this core including two plug valves (88, 92).

5. An apparatus according to claim 1, said spaces being so disposed that the adsorbent bed (49) is of the radial flow type.

6. An apparatus according to claim 1, said spaces being so disposed that the adsorbent bed (49) is of the axial flow type.

7. An apparatus according to claim 1, in which the means (51, 54 to 56) for driving in rotation are completely contained in the same said space (75) of the case (40) containing the substitution gas.

8. An apparatus according to claim 1, in which the spaces (58, 59) respectively communicating with said fourth orifice (68) and first orifice (67) are adjacent to each other, as are the other two said spaces (74, 75).

9. An apparatus for producing ozone, comprising a case (40) containing an annular bed (49) of adsorbent material, the annular bed (49) occupying less than all the interior of the case (40), thereby to leave a volume between the annular bed (49) and the case (40);

means (73) dividing the annular bed (49) into a plurality of sectors (72);

partition walls (53, 57, 63 to 66, 71; 57, 88, 91, 92, 95; 102, 103, 105) dividing said volume between the annular bed (49) and the case (40) into four spaces (59, 74, 75, 58) respectively communicating with a first oxygen-ozone mixture inlet orifice (67), a second oxygen outlet orifice (69), a third substitution gas orifice (70) and a fourth orifice (68) for the outlet of production gas consisting essentially of the substitution gas and ozone, these partition walls putting said second orifice (69) in communication with a downstream side, with respect to adsorption, of a first groups of said sectors ($72_1$), said first orifice (61) with an upstream side, with respect to adsorption, of a second group of said sectors ($72_1, 72_3, 72_4$) constituted by said first group ($72_1$) and a third group of said sectors ($72_3, 72_4$) adjacent to said first group, said fourth orifice (68) with a downstream side, with respect to countercurrent desorption, of a fourth group of said sectors ($72_2$) constituted by the remaining said sectors, and said third orifice (70) with an upstream side, with respect to desorption, of said third and fourth groups of sectors ($72_2, 72_3, 72_4$); and means (51; 55) for effecting a relative rotation between the annular bed (49) and said partition walls in such direction that each said sectors (72) is in succession and cyclically part of said first, fourth and third groups.

10. An apparatus according to claim 9, including means mounting the adsorbent bed (49) rotatively in the case (40) and means stationarily fixing the partition walls.

11. An apparatus according to claim 9, including means stationarily fixing the adsorbent bed (49) and means mounting the partition walls rotatively in the case (40).

12. An apparatus according to claim 11, in which the partition walls constitute a core (44), means mounting said core (44) rotatively at the center of the adsorbent bed (49), this core including two plug valves (88, 92).

13. An apparatus according to claim 9, said spaces being so disposed that the absorbent bed (49) is of the radial flow type.

14. An apparatus according to claim 9, said spaces being so disposed that the adsorbent bed (49) is of the axial flow type.

15. An apparatus according to claim 9, in which the means (51, 54 to 56) for driving in rotation are completely contained in the same said space (75) of the case (40) containing the substitution gas.

16. An apparatus according to claim 9, in which the spaces (58, 59) respectively communicating with said fourth orifice (68) and first orifice (67) are adjacent to each other, as are the other two said spaces (74, 75).

* * * * *